(12) United States Patent
Shinohara et al.

(10) Patent No.: US 8,656,240 B2
(45) Date of Patent: Feb. 18, 2014

(54) REQUEST FOR RETRANSMISSION WHEN FORMAT OF DATA IS INCORRECT

(75) Inventors: Chiaki Shinohara, Fukuoka (JP);
Kazuhisa Obuchi, Kawasaki (JP);
Hirotoshi Shimizu, Kawasaki (JP);
Akihide Otonari, Fukuoka (JP);
Yoshinori Soejima, Fukuoka (JP); Miki Yamasaki, Fukuoka (JP); Shinya Okamoto, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 225 days.

(21) Appl. No.: 12/662,162

(22) Filed: Apr. 1, 2010

(65) Prior Publication Data

US 2010/0199139 A1 Aug. 5, 2010

Related U.S. Application Data

(63) Continuation of application No. PCT/JP2007/069379, filed on Oct. 3, 2007.

(51) Int. Cl.
*G08C 25/02* (2006.01)
*H04L 1/18* (2006.01)
*H03M 13/00* (2006.01)

(52) U.S. Cl.
USPC .......................................... 714/748; 714/751

(58) Field of Classification Search
None
See application file for complete search history.

(56) References Cited

U.S. PATENT DOCUMENTS

| 4,667,323 | A | * | 5/1987 | Engdahl et al. ............... 370/451 |
| 5,150,368 | A | * | 9/1992 | Autruong et al. ............. 714/747 |
| 6,141,784 | A | * | 10/2000 | Davis et al. ................... 714/748 |
| 6,640,325 | B1 | * | 10/2003 | Fischer ......................... 714/748 |
| 7,454,554 | B1 | * | 11/2008 | Norrie et al. .................. 710/316 |
| 2002/0172208 | A1 | * | 11/2002 | Malkamaki .................... 370/400 |
| 2003/0101274 | A1 | | 5/2003 | Yi et al. |
| 2003/0133426 | A1 | * | 7/2003 | Schein et al. ................. 370/337 |
| 2003/0169722 | A1 | * | 9/2003 | Petrus et al. .................. 370/347 |

(Continued)

FOREIGN PATENT DOCUMENTS

| CN | 101034965 | 9/2007 |
| EP | 0612169 A2 | 8/1994 |

(Continued)

OTHER PUBLICATIONS

Korean Office Action for corresponding Korean Patent Application No. 10-2010-7006552, mailed May 13, 2011.

(Continued)

*Primary Examiner* — Gabriel Chu
(74) *Attorney, Agent, or Firm* — Staas & Halsey LLP

(57) ABSTRACT

A wireless communication apparatus that uses a communication protocol to transmit and receive data with a data check bit, including a received data determining section that performs a data check for received data by using the data check bit to determine whether the data is error; a received result transmitting section that, when determined to be error, discards the data and transmits a retransmission request to other wireless communication apparatus of the transmitting origin, whereas determined to be not error, transmits a message indicating that the data is normal to the other wireless communication apparatus of the transmitting origin; and a retransmission asking section that determines whether a format of the data is incorrect or normal, and when determined to be normal, passes the data to predetermined processing, whereas when determined to be incorrect, discards the data and asks the received result transmitting section to request retransmission of the data.

16 Claims, 11 Drawing Sheets

(56) References Cited

U.S. PATENT DOCUMENTS

| | | |
|---|---|---|
| 2004/0153852 A1 | 8/2004 | Wu |
| 2004/0240433 A1* | 12/2004 | Lobig .................... 370/352 |
| 2005/0172199 A1 | 8/2005 | Miller et al. |
| 2006/0037069 A1* | 2/2006 | Fisher et al. .................... 726/11 |
| 2006/0045032 A1 | 3/2006 | Hamada |
| 2006/0114813 A1 | 6/2006 | Seki et al. |
| 2006/0150050 A1 | 7/2006 | Choi et al. |
| 2007/0147385 A1 | 6/2007 | Druke et al. |
| 2008/0298323 A1 | 12/2008 | Yi et al. |
| 2009/0175374 A1 | 7/2009 | Seki et al. |
| 2010/0020772 A1 | 1/2010 | Yi et al. |
| 2010/0074212 A1 | 3/2010 | Yi et al. |
| 2010/0074213 A1 | 3/2010 | Yi et al. |
| 2010/0074214 A1 | 3/2010 | Yi et al. |
| 2010/0074233 A1 | 3/2010 | Yi et al. |

FOREIGN PATENT DOCUMENTS

| | | |
|---|---|---|
| EP | 1 630 981 A2 | 3/2006 |
| JP | 5-122278 | 5/1993 |
| JP | 08-051413 | 2/1996 |
| JP | 2001-186271 | 7/2001 |
| JP | 2006-67099 | 3/2006 |
| KR | 10-2003-0004959 | 1/2003 |
| KR | 10-2003-0060027 | 7/2003 |
| WO | 2004/088879 A1 | 10/2004 |
| WO | 2005/004376 | 1/2005 |
| WO | 2006/106617 A1 | 10/2006 |

OTHER PUBLICATIONS

English Translation of the International Preliminary Report on Patentability and Written Opinion mailed May 14, 2010 and issued in corresponding International Patent Application PCT/JP2007/069379.

"3GGP TS 36.300 V8.1.0 (Jun. 2007)", Technical Specification, 106 pages.

"3GPP TS 25.321 V3.7.0 (Mar. 2001)", 3GPP, MAC protocol specification (Release 1999), Internet: http://www.3gpp.org/ftp/Specs/archive/25_series/25.321/25321-370.zip.

Samsung, "MAC Function: ARQ", 3GPP TSG-RAN2 Meeting #50, Internet: http://www.3gpp.org/ftp/tsg_ran/WG2_RL2/TSGR2_50/Documents/R2-060077.zip Jan. 2006.

International Search Report for PCT/JP2007/069379, mailed Jan. 15, 2008.

3GPP TS 25.321 v5.1.0, Jun. 2002, URL, http://www.3gpp.org/ftp/Specs/archive/25_series/25.321/25321-510.zip; $3^{rd}$ Generation Partnership Project; Technical Specification Group Radio Access Network; MAC protocol specification (Release 5); 3GPP; pp. 1-52.

Japanese Office Action for corresponding Japanese Application 2009-535924; dated Feb. 7, 2012.

Japanese Office Action issued Aug. 14, 2012 in corresponding Japanese Patent Application No. 2009-535924 (including Refusal Remarks).

Chinese Office Action mailed May 28, 2012 issued in corresponding Chinese Patent Application No. 200780100941.0.

Australian Patent Examination Report No. 1 issued Sep. 3, 2012 in corresponding Australian Patent Application No. 2011211385.

Canadian Office Action issued in corresponding Canadian Patent Application No. 2,700,252 issued on Nov. 28, 2012.

Extended European Search Report mailed Mar. 7, 2013 for corresponding European Application No. 07829118.4.

Notification of Reasons for Refusal mailed Nov. 12, 2013 for corresponding Japanese Application No. 2012-246065.

Office Action issued in copending U.S. Appl. No. 14/011,788 on Dec. 13, 2013.

* cited by examiner

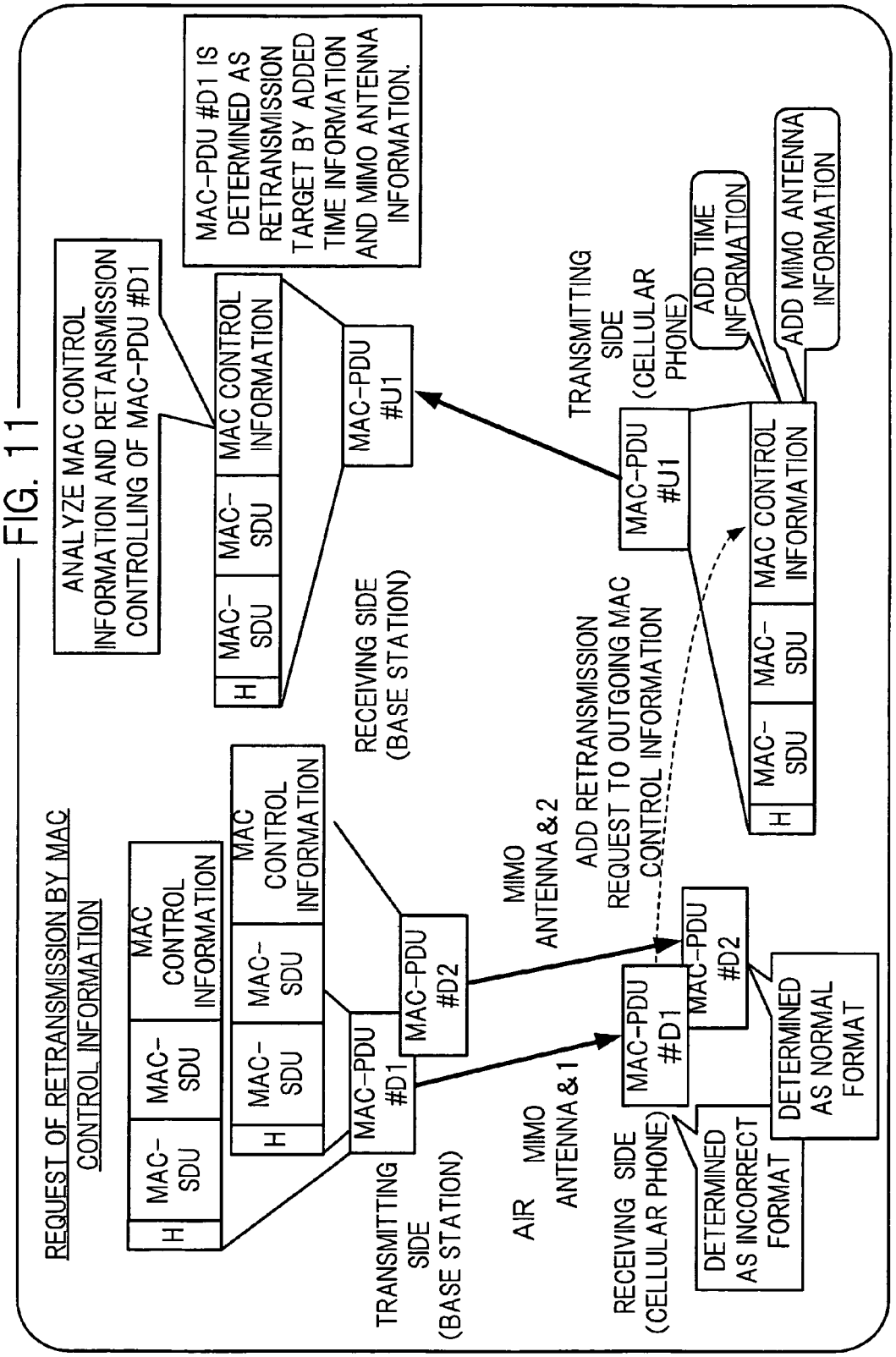

REQUEST FOR RETRANSMISSION WHEN FORMAT OF DATA IS INCORRECT

CROSS-REFERENCE TO RELATED APPLICATION

This is a continuation application of PCT/JP2007/069379, filed on Oct. 3, 2007.

TECHNICAL FIELD

The embodiment discussed herein is related to a wireless communication apparatus that uses a communication protocol to transmit and receive data with a data check bit, a wireless communication control apparatus that is used in the wireless communication apparatus to control communication, a wireless communication method that uses the wireless communication apparatus, a storage medium storing a wireless communication program that causes the wireless communication apparatus to perform data reception processing, a wireless communication control method that uses the wireless communication control apparatus used in the wireless communication apparatus to control communication, and a storage medium storing a wireless communication control program that is used in the wireless communication control apparatus which is used in the wireless communication apparatus to control communication.

BACKGROUND ART

Recently, a protocol of wireless communication system referred to as 3G (3rd generation) is widely employed.

There are some development stages in this 3G, and in addition to the original 3G employed in FOMA and the like, there appears a cellular telephone employing a protocol referred to as 3.5G or HSDPA in which speed of communication is more enhanced. Moreover, now a protocol referred to as Super3G or 3.9G is examined.

A protocol in a wireless communication system of this 3G group is divided into plural layers. A layer 1 among them is a layer referred to as a physical layer and handles actual communication.

FIG. 1 is a protocol block diagram of a layer 2.

The layer 2 positioned on the layer 1 includes three sub layers of a MAC (Medium Access Control), a RLC (Radio Link Control), and a PDCP (Packet Data Convergence Protocol).

Here, a whole of one processing function arranged in one layer or one sub layer is called an entity. PDCP entity or RLC entity exists as many as LCH (Logical Channel) to be used (n pieces of #1~#n in the example illustrated in FIG. 1). Each PDCP and each RLC correspond to each LCH and transfer a PDU (Protocol Data Unit). Here, the PDCP entity processes concealment of data and the like in 3.9G (Super3G), and the RLC entity processes retransmission control of data and the like.

A MAC entity integrates PDU's transferred from each RLC entity via each LCH into one PDU and transmits the PDU to a HARQ (Hybrid Automatic Repeat reQuest). The HARQ transfers the PDU to the lower layer 1 via a TRCH (Transport Channel).

On a receiving side, the MAC entity divides the PDU transferred from the layer 1 via the TRCH into one PDU or plural PDU's, and transfers the divided PDU's (PDU) to each RLC entity via each LCH.

Incidentally, although there is a layer 3 on the layer 2, the layer 3 is not directly related here so that its illustration and explanation are omitted.

Here, for each PDU, a mechanism capable of exchanging information with a counterpart side by adding not only user data but also control information necessary for an entity on the counterpart side is examined in 3GPP (3rd Generation Partnership Project).

FIG. 2 illustrates an example of a data flow of a PDU with control information added thereto.

In the RLC entity, a header H is added to a RLC-SDU (Source Data Unit) received from the PDCP entity of the same LCH to be transmitted to the MAC entity as a PDU in a RLC sub layer (RLC-PDU). In the MAC entity, RLC-PDU's transmitted from RLC entities of plural LCH's are received as SDU's (MAC-SDU's) in the MAC sub layers. The plural MAC-SDU's are integrated, added with MAC control information and further added with a header H, and transmitted to the layer 1 as one single MAC-PDU. In the layer 1, the MAC-PDU transmitted from the MAC sub layer is transmitted by wireless.

On the other hand, on the receiving side, the MAC-PDU received in the layer 1 is passed to the MAC entity, and in the MAC entity, the received MAC-PDU is divided into MAC-SDU's for each LCH and passed to the RLC entities of each LCH.

Incidentally, in this FIG. 2, a case of normally being transmitted and received is exemplified. Incidentally, the HARQ (see FIG. 1) included in the MAC entity checks whether reception is normal or abnormal by a CRC (Cyclic Redundancy Check), and transmits an ACK (Acknowledgment) toward a transmitting origin if reception is normal (CRC-OK) or transmits a NACK (Negative Acknowledgment) when reception is abnormal (CRC-NG), so that a retransmission request is performed.

FIG. 3 illustrates a data flow including returning of the ACK and NACK by the HARQ on the receiving side.

Here, a case is illustrated in which a HARQ transmission controlling section on the transmitting side operates, and two MAC-PDU's of a MAC-PDU #1 and a MAC-PDU #2 are transmitted toward the receiving side. On the receiving side, these two MAC-PDU's are received, and a HARQ reception controlling section on the receiving side performs a CRC check for each of the received MAC-PDU's. As a result of the CRC check, it is determined that the MAC-PDU #1 is abnormal in receiving (CRC-NG), and a NACK is transmitted toward the transmitting side at this time. When the HARQ transmission controlling section on the transmitting side receives the NACK, the HARQ transmission controlling section performs retransmission control of the same MAC-PDU #1. On the transmitting side, a time when the MAC-PDU #1 is transmitted is managed, and when the NACK is received, it is possible to identify retransmission of which particular MAC-PDU the NACK requests, from a received time of the NACK. Therefore, on the receiving side of the MAC-PDU, simply by transmitting the NACK, without transmitting an identifier of a MAC-PDU in which an abnormality in receiving occurs on the receiving side, it is possible to recognize in which particular MAC-PDU the abnormality in receiving occurs on the transmitting side.

As for the MAC-PDU #2 that is transmitted following the MAC-PDU #1 from the transmitting side, when reception is normal (CRC-OK), the HARQ reception controlling section passes the MAC-PDU #2 to the MAC-PDU determination processing section and also transmits an ACK toward the transmitting side. The transmitting side which receives the ACK recognizes that retransmission control for the MAC- PDU #2 is unnecessary and transmits a MAC-PDU (here, MAC-PDU #n) to be transmitted next.

In the MAC-PDU determination processing section, it is determined whether the MAC-PDU #2 received from the HARQ reception controlling section is a PDU in a normal format or a PDU in an incorrect format.

FIG. 4 is a schematic diagram illustrating a determination processing whether a PDU is in a normal format or an incorrect format in the MAC-PDU determination processing section.

As described above, when the HARQ reception controlling section determines that the reception is normal as a result of the CRC check, the HARQ reception controlling section transmits an ACK toward the transmitting side and also passes the MAC-PDU to the MAC-PDU determination processing section. When the MAC-PDU determination processing section receives the MAC-PDU from the HARQ reception controlling section, it is determined whether the format of the MAC-PDU is normal or incorrect.

For example, the following cases are considered as an incorrect format.
(1) An identifier of a LCH is out of range.
(2) More headers than specified in exist (E (Extension) flag in a header is ON).
(3) A sum of Length information in a header is longer than a received MAC-PDU.
(4) An identifier of the MAC control information is out of range.
(5) An identifier of the MAC control information is different from the Length.

In the MAC-PDU determination processing section, it is determined whether the MAC-PDU is in a normal format or an incorrect format, and when it is determined to be the normal format, the MAC-PDU is divided into MAC-SDU's for each LCH to be passed to a RLC entity of each LCH (see FIG. 2), and when it is determined to be the incorrect format, the MAC-PDU is discarded. In this case, the retransmission control is not performed in the MAC entity. As described above, since the retransmission control is performed in the RLC entity, if the RLC-PDU to be received by the RLC entity is not received, the retransmission request is performed from the RLC entity. However, since there is a condition for performing the retransmission control in the RLC entity, the retransmission control is not performed immediately.

Subsequently, as a technique related to the present invention, an outline of MIMO (Multiple-Input Multiple-Output) to perform communication by using plural antennas will be explained.

FIG. 5 is a block diagram illustrating an outline of a transmitting apparatus and a receiving apparatus employing the MIMO, and FIG. 6 illustrates a data flow when the MIMO is employed.

In a MAC-PDU generation processing section 11 on the transmitting side, RLC-PDU's (MAC-SDU's) received from each RLC are integrated to generate a MAC-PDU as illustrated in FIG. 2. Although this MAC-PDU is generated in multiple numbers depending on generation of data to be transmitted, in FIG. 5 and FIG. 6, two MAC-PDU's of the MAC-PDU #1 and the MAC-PDU #2 are typically illustrated. The MAC-PDU's generated in the MAC-PDU generation processing section 11 are inputted into a layer 1 transmission processing section 13 via the HARQ transmission controlling section 12, the MAC-PDU's are allocated to plural antennas 14a, 14b (here, two antennas as one example), respectively, and transmitted while being shared by these two antennas 14a, 14b.

On the receiving side, the MAC-PDU's transmitted from these two antennas 14a, 14b on the transmitting side are received by two antennas 24a, 24b, and passed to a layer 1 reception processing section 23. In FIG. 6, a pair of the antennas for transmitting and receiving is referred to as a MIMO antenna while identifying each as a MIMO antenna &1 and a MIMO antenna &2.

The MAC-PDU's received via the plural antennas 24a, 24b in the layer 1 reception processing section 22 on the receiving side are, after a CRC check is performed and a NACK and an ACK are transmitted by the HARQ reception controlling section 22, to be transmitted to the MAC-PDU determination processing section 21. In the MAC-PDU determination processing section 21, the normality or incorrectness of the format is determined, and when determined to be the normal format, the MAC-PDU's are divided into MAC-PDU's for each LCH to be passed to each RLC entity. A MAC-PDU in the incorrect format is discarded in the MAC-PDU determination processing section 21.

Thus, the MIMO is a technique of transmitting and receiving in parallel by using plural antennas, and enables high speed communication since the plural antennas are used so that the bandwidth is widened.

In the above-described communication algorithm, the MAC-PDU determination processing section on the receiving side determines whether a format of the received MAC-PDU is normal or incorrect and when determined to be the incorrect format, the MAC-PDU determination processing section discards the MAC-PDU. Although the acquisition of the discarded data is handled by the retransmission control in the RLC entity, as described above, the retransmission control in the RLC entity is not immediately performed, but it takes some time before the request of retransmission so that a throughput as a whole may decrease.

DISCLOSURE OF INVENTION

A first wireless communication apparatus out of the wireless communication apparatus of the present invention uses a communication protocol to transmit and receive data with a data check bit, and includes:

a receiving section that receives the data from other wireless communication apparatus of a transmitting origin;

a received data determining section that performs a data check for the received data by using the data check bit and performs a determination whether or not the data is an error;

a received result transmitting section that, when a result of the determination is an error, discards the data and transmits a retransmission request for the data to the other wireless communication apparatus of the transmitting origin, and when a result of the determination is not an error, transmits a message indicating that the data is normal to the other wireless communication apparatus of the transmitting origin;

a format determining section that determines whether a format of the data is incorrect or normal, and that passes the data to predetermined processing when the format of the data is determined to be normal; and a retransmission asking section that discards the data and asks the received result transmitting section to request retransmission of the data when the format of the data is determined to be incorrect.

Since the first wireless communication apparatus of the present invention determines whether a format of received data is incorrect or normal, and includes the retransmission asking section that, when the format of the data is determined to be incorrect, discards the data and asks the received result transmitting section to request retransmission of the data, the retransmission request is made immediately when the format of the data is incorrect and thus a throughput of communication is improved.

Here, the communication protocol of the first wireless communication apparatus typically includes a MAC (Medium Access Control) protocol, the data check is a CRC (Cyclic Redundancy Check), and the predetermined processing is a RLC (Radio Link Control).

Further, a second wireless communication apparatus out of the wireless communication apparatus of the present invention uses a communication protocol to transmit and receive data with a data check bit, and includes:

a transmitting section that transmits the data toward another wireless communication apparatus of a transmitting destination, wherein the retransmission asking section, when the format of the data is determined to be incorrect, discards the data and instead of asking the received result transmitting section to request retransmission of the data, asks the transmitting section to embed a retransmission request in communication control information of the data to be transmitted to the other wireless communication apparatus of the transmitting origin and to transmit the data.

Since the second wireless communication apparatus of the present invention determines whether a format of data is incorrect or normal, and includes the retransmission asking section that, when the format of the data is determined to be incorrect, discards the data and asks the transmitting section to embed a retransmission request in communication control information of the data to be transmitted to the other wireless communication apparatus of the transmitting origin and to transmit the data, the retransmission request of the data is made immediately when the communication control information of the data is incorrect and thus a throughput of communication is improved.

Here, in the second wireless communication apparatus of the present invention, it is preferable that the retransmission asking section asks the transmitting section to further embed a retransmission request including reception time information of the received data in communication control information of the data to be transmitted to the other wireless communication apparatus of the transmitting origin and to transmit the data.

A transmission time of data to be transmitted to the transmitting origin that has transmitted the incorrect data is not regulated uniformly. However, by embedding a retransmission request including reception time information of the incorrect data in communication control information of the data to be transmitted to the transmitting origin, on the transmitting side that has transmitted the incorrect data, it is possible to easily identify the incorrect data.

Moreover, it is preferable that the second wireless communication apparatus further includes plural antennas and performs MINO (Multiple-Input Multiple-Output) communication by using the plural antennas, and the retransmission asking section asks the transmitting section to embed a retransmission request further including antenna identification information as well as the reception time information of the received data in communication control information of the data to be transmitted to the other wireless communication apparatus of the transmitting origin and to transmit the data.

In the wireless communication apparatus employing the MINO technique, wireless communication is performed in parallel by using plural antennas. Therefore, by embedding a retransmission request including antenna identification information to identify a specific antenna that has received the incorrect data along with the reception time information in the communication control information, on the transmitting side that has transmitted the incorrect data, it is possible to easily identify the incorrect data by the reception time information and the antenna identification information.

The communication protocol of the second wireless communication apparatus typically includes a MAC (Medium Access Control) protocol, the data check is a CRC (Cyclic Redundancy Check), and the predetermined processing is a RLC (Radio Link Control).

Incidentally, in either of the first and the second wireless communication apparatus, it is preferable that the retransmission asking section does not perform the retransmission request of the data anymore when a format of the retransmitted data has a same incorrect content.

When a same incorrect content is included in the retransmitted data, it means that the incorrectness has not been resolved on the transmitting side, and a possibility of obtaining data in which the incorrectness is resolved is low through further retransmission request. So it is desirable not to perform the retransmission request of the data anymore since it only increases traffic.

Still more, a first wireless communication control apparatus out of the wireless communication control apparatus of the present invention is used in a wireless communication apparatus which uses a communication protocol to transmit and receive data with a data check bit and which includes a receiving section and a received result transmitting section, to control communication, and the first wireless communication control apparatus includes:

a received data determining section that performs a data check for the received data by using the data check bit and performs a determination whether or not the data is an error;

a received result transmission instructing section that, when a result of the determination is an error, discards the data and instructs the received result transmitting section to transmit a retransmission request of the data to the other wireless communication apparatus of the transmitting origin, and when a result of the determination is not an error, instructs the received result transmitting section to transmit a message indicating that the data is normal to the other wireless communication apparatus of the transmitting origin;

a format determining section that determines whether a format of the data is incorrect or normal, and that passes the data to predetermined processing when the format of the data is determined to be normal; and a retransmission asking section that discards the data and asks the received result transmitting section to request retransmission of the data when the format of the data is determined to be incorrect.

Furthermore, a second wireless communication control apparatus out of the wireless communication control apparatus of the present invention is used in a wireless communication apparatus which uses a communication protocol to transmit and receive data including communication control information with a data check bit and which includes a receiving section and a received result transmitting section, to control communication, and the second wireless communication control apparatus includes:

a received data determining section that performs a data check for the received data by using the data check bit and performs a determination whether or not the data is an error;

a received result transmission instructing section that, when a result of the determination is an error, discards the data and instructs the received result transmitting section to transmit a retransmission request of the data to the other wireless communication apparatus of the transmitting origin, and when a result of the determination is not an error, instructs the received result transmitting section to transmit a message indicating that the data is normal to the other wireless communication apparatus of the transmitting origin;

a format determining section that determines whether a format of the data is incorrect or normal, and that passes the data to predetermined processing when the format of the data is determined to be normal; and a retransmission asking section that, when the format of the data is determined to be incorrect, discards the data and asks the transmitting section to embed a retransmission request in communication control information of the data to be transmitted to the other wireless communication apparatus of the transmitting origin.

A first wireless communication method out of the wireless communication methods of the present invention uses a wireless communication apparatus which uses a communication protocol to transmit and receive data with a data check bit and which includes a receiving section, a received data determining section, a received result transmitting section, a format determining section, and a retransmission asking section, the first wireless communication method includes:

receiving the data from other wireless communication apparatus of a transmitting origin by using the receiving section;

received-data-determining of, by using the received data determining section, performing a data check for the received data by using the data check bit and determining whether or not the data is an error;

received-result-transmitting of, by using the received result transmitting section, discarding the data and transmitting a retransmission request of the data to the other wireless communication apparatus of the transmitting origin when a result of the determination is an error, and transmitting a message indicating that the data is normal to the other wireless communication apparatus of the transmitting origin when a result of the determination is not an error;

format-determining of, by using the format determining section, determining whether a format of the data is incorrect or normal, and passing the data to predetermined processing when the format of the data is determined to be normal; and retransmission-asking of, by using the retransmission asking section, discarding the data and asking the received result transmitting section to request retransmission of the data when the format of the data is determined to be incorrect.

Still further, a second wireless communication method out of the wireless communication methods of the present invention uses a wireless communication apparatus which uses a communication protocol to transmit and receive data including communication control information with a data check bit and which includes a receiving section, a transmitting section, a received data determining section, a received result transmitting section, a format determining section, and a retransmission asking section, the second wireless communication method includes:

receiving the data from other wireless communication apparatus of a transmitting origin by using the receiving section;

received-data-determining of, by using the received data determining section, performing a data check for the received data by using the data check bit and determining whether or not the data is an error;

received-result-transmitting of, by using the received result transmitting section, discarding the data and transmitting a retransmission request of the data to the other wireless communication apparatus of the transmitting origin when a result of the determination is an error, and transmitting a message indicating that the data is normal to the other wireless communication apparatus of the transmitting origin when a result of the determination is not an error;

format-determining of, by using the format determining section, determining whether a format of the data is incorrect or normal, and passing the data to predetermined processing when the format of the data is determined to be normal; and retransmission-asking of, by using the retransmission asking section in the retransmission-asking, discarding the data when the format of the data is determined to be incorrect and asking the transmitting section to embed the retransmission request in communication control information of the data to be transmitted to the other wireless communication apparatus of the transmitting origin and to transmit the data.

Further, a storage medium storing a first wireless communication program out of the wireless communication programs of the present invention causes a wireless communication apparatus to perform reception processing of data, wherein the wireless communication apparatus uses a communication protocol to transmit and receive data with a data check bit and includes a receiving section, a received data determining section, a received result transmitting section, a format determining section, and a retransmission asking section, the first wireless communication program causing the wireless communication apparatus to perform:

receiving the data from other wireless communication apparatus of a transmitting origin by using the receiving section;

received-data-determining of, by using the received data determining section, performing a data check for the received data by using the data check bit and determining whether or not the data is an error;

received-result-transmitting of, by using the received result transmitting section, discarding the data and transmitting a retransmission request of the data to the other wireless communication apparatus of the transmitting origin when a result of the determination is an error, and transmitting a message indicating that the data is normal to the other wireless communication apparatus of the transmitting origin when a result of the determination is not an error;

format-determining of, by using the format determining section, determining whether a format of the data is incorrect or normal, and passing the data to predetermined processing when the format of the data is determined to be normal; and retransmission-asking of, by using the retransmission asking section, discarding the data and asking the received result transmitting section to request retransmission of the data when the format of the data is determined to be incorrect.

Yet more, a storage medium storing a second wireless communication program out of the wireless communication programs of the present invention causes a wireless communication apparatus to perform reception processing of data, wherein the wireless communication apparatus uses a communication protocol to transmit and receive data including communication control information with a data check bit and includes a receiving section, a transmitting section, a received data determining section, a received result transmitting section, a format determining section, and a retransmission asking section, the second wireless communication program causing the wireless communication apparatus to perform:

receiving the data from other wireless communication apparatus of a transmitting origin by using the receiving section;

received-data-determining of, by using the received data determining section, performing a data check for the received data by using the data check bit and determining whether or not the data is an error;

received-result-transmitting of, by using the received result transmitting section, discarding the data and transmitting a retransmission request of the data to the other wireless communication apparatus of the transmitting origin when a result of the determination is an error, and format-determining of, by using the format determining section, determining whether a format of the data is incorrect or normal, and passing the data to predetermined processing when the format of the data is determined to be normal; and retransmission-asking of, discarding the data, when the format of the data is determined to be incorrect, and asking the transmitting section to embed the retransmission request in communication control information of the data to be transmitted to the other wireless communication apparatus of the transmitting origin and to transmit the data.

Also, a first wireless communication control method out of the wireless communication control methods of the present invention uses a wireless communication control apparatus used in a wireless communication apparatus that uses a communication protocol to transmit and receive data with a data check bit and that includes a receiving section and a received result transmitting section, to control communication, and the first wireless communication control method includes:

received-data-determining of performing a data check for the received data by using the data check bit and determining whether or not the data is an error;

received-result-transmission-instructing of discarding the data and instructing the received result transmitting section to transmit a retransmission request of the data to the other wireless communication apparatus of the transmitting origin when a result of the determination is an error, and instructing the received result transmitting section to transmit a message indicating that the data is normal to the other wireless communication apparatus of the transmitting origin when a result of the determination is not an error;

format-determining of determining whether a format of the data is incorrect or normal, and passing the data to predetermined processing when the format of the data is determined to be normal; and retransmission-asking of discarding the data and asking the received result transmitting section to request retransmission of the data when the format of the data is determined to be incorrect.

Further more, a second wireless communication control method out of the wireless communication control methods of the present invention uses a wireless communication control apparatus used in a wireless communication apparatus that uses a communication protocol to transmit and receive data with a data check bit and that includes a receiving section, a transmitting section and a received result transmitting section, to control communication, and the second wireless communication control method includes:

received-data-determining of performing a data check for the received data by using the data check bit and determining whether or not the data is an error;

received-result-transmission-instructing of discarding the data and instructing the received result transmitting section to transmit a retransmission request of the data to the other wireless communication apparatus of the transmitting origin when a result of the determination is an error, and instructing the received result transmitting section to transmit a message indicating that the data is normal to the other wireless communication apparatus of the transmitting origin when a result of the determination is not an error;

format-determining of determining whether a format of the data is incorrect or normal, and passing the data to predetermined processing when the format of the data is determined to be normal; and a retransmission asking of, by using the retransmission asking section, discarding the data when the format of the data is determined to be incorrect and asking the transmitting section to embed the retransmission request in communication control information of the data to be transmitted to the other wireless communication apparatus of the transmitting origin.

Moreover, a first wireless communication control program out of the wireless communication control programs of the present invention causes a wireless communication control apparatus to perform reception processing of data, wherein the wireless communication control apparatus is used in a wireless communication apparatus that uses a communication protocol to transmit and receive data with a data check bit and includes a receiving section and a received result transmitting section, to control information, the first wireless communication control program causing the wireless communication apparatus to perform:

received-data-determining of performing a data check for the received data by using the data check bit and determining whether or not the data is an error;

received-result-transmission-instructing of discarding the data and instructing the received result transmitting section to transmit a retransmission request of the data to the other wireless communication apparatus of the transmitting origin when a result of the determination is an error, and instructing the received result transmitting section to transmit a message indicating that the data is normal to the other wireless communication apparatus of the transmitting origin when a result of the determination is not an error;

format-determining of determining whether a format of the data is incorrect or normal, and passing the data to predetermined processing when the format of the data is determined to be normal; and retransmission-asking of discarding the data and asking the received result transmitting section to request retransmission of the data when the format of the data is determined to be incorrect.

Still more, a second wireless communication control program out of the wireless communication control programs of the present invention causes a wireless communication control apparatus to perform reception processing of data, wherein the wireless communication control apparatus is used in a wireless communication apparatus that uses a communication protocol to transmit and receive data including communication control information with a data check bit and includes a receiving section, a transmitting section, and a received result transmitting section, to control information, the second wireless communication control program causing the wireless communication apparatus to perform:

received-data-determining of performing a data check for the received data by using the data check bit and determining whether or not the data is an error;

received-result-transmission-instructing of discarding the data and instructing the received result transmitting section to transmit a retransmission request of the data to the other wireless communication apparatus of the transmitting origin when a result of the determination is an error, and instructing the received result transmitting section to transmit a message indicating that the data is normal to the other wireless communication apparatus of the transmitting origin when a result of the determination is not an error;

format-determining of determining whether a format of the data is incorrect or normal, and passing the data to predetermined processing when the format of the data is determined to be normal; and retransmission-asking of discarding the data when the format of the data is determined to be incorrect and asking the transmitting section to embed the retransmission request in communication control information of the data to be transmitted to the other wireless communication apparatus of the transmitting origin and to transmit the data.

Here, main aspects are described about the wireless communication control apparatus, the wireless communication control method, the wireless communication program storage medium, the wireless communication control method, and the wireless communication control program storage medium. However, all modes that correspond to the aspects described about the wireless communication apparatus of the above-described present invention are also included in the wireless communication control apparatus, the wireless communication control method, the wireless communication program storage medium, the wireless communication control method, and the wireless communication control program storage medium, as long as the modes are appropriate to the scope of the present invention.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates a data flow in the embodiment illustrated in FIG. 10.

THE BEST MODE FOR CARRYING OUT THE INVENTION

Embodiments of the present invention will be described with reference to the drawings.

Figure 7:
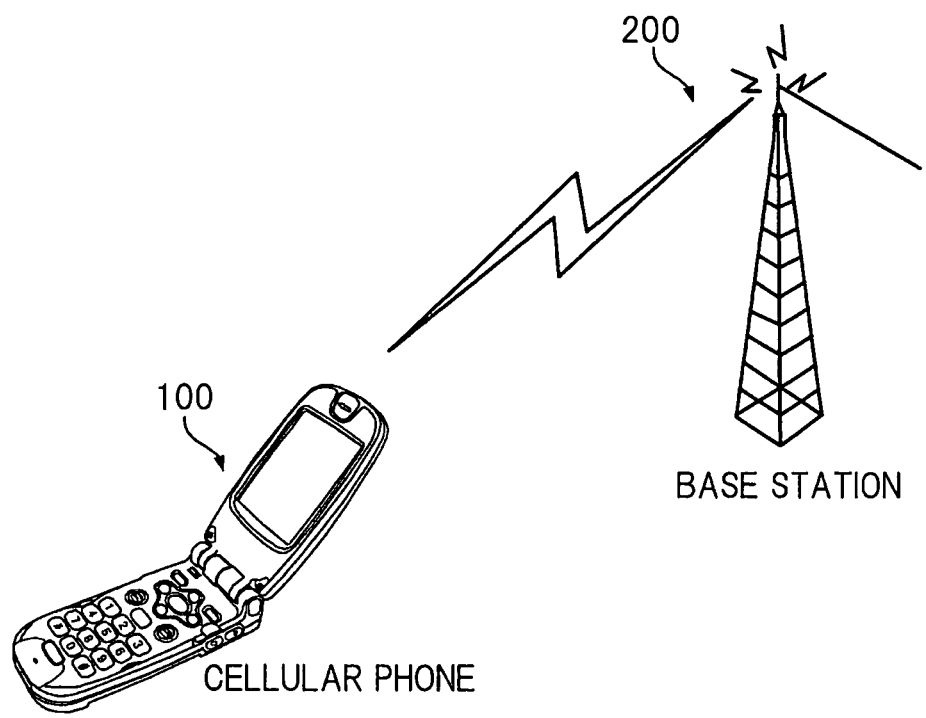
FIG. 7 is a schematic diagram illustrating one example of a communication system to which one embodiment of the present invention is applied.

FIG. 7 is a schematic diagram illustrating one example of a communication system to which one embodiment of the present invention is applied.

FIG. 7 illustrates a cellular telephone 100 and a base station 200 that performs wireless communication with the cellular telephone 100. Incidentally, although many cellular telephones and many base stations exist, and furthermore many switchboards exist in a real communication system, here, only a minimum configuration necessary to explain the present embodiment is illustrated.

Wireless communication is performed between the cellular telephone 100 and the base station 200, such that when the cellular telephone 100 becomes the transmitting side, the base station 200 becomes the receiving side, whereas when the base station 200 becomes the transmitting side, the cellular telephone 100 becomes the receiving side. In other words, in either one of the cellular telephone 100 and the base station 200, a configuration of the transmitting side and a configuration of the receiving side are provided as described in the following.

In the above-described conventional technique, when a format of the received MAC-PDU is incorrect, the MAC-PDU is discarded and a request of retransmission is handled by the RLC. However, in the present embodiment, when a format of the received MAC-PDU is incorrect, as illustrated in the following two examples, a request of retransmission is made in the MAC sub layer, thereby improving the throughput of the communication. The present embodiment is different from the above-mentioned conventional technique only in a point that a request of retransmission is made in the MAC sub layer, so that the explanation made about the above-mentioned conventional technique is applied for the other points other than the point as they are.

Figure 5:
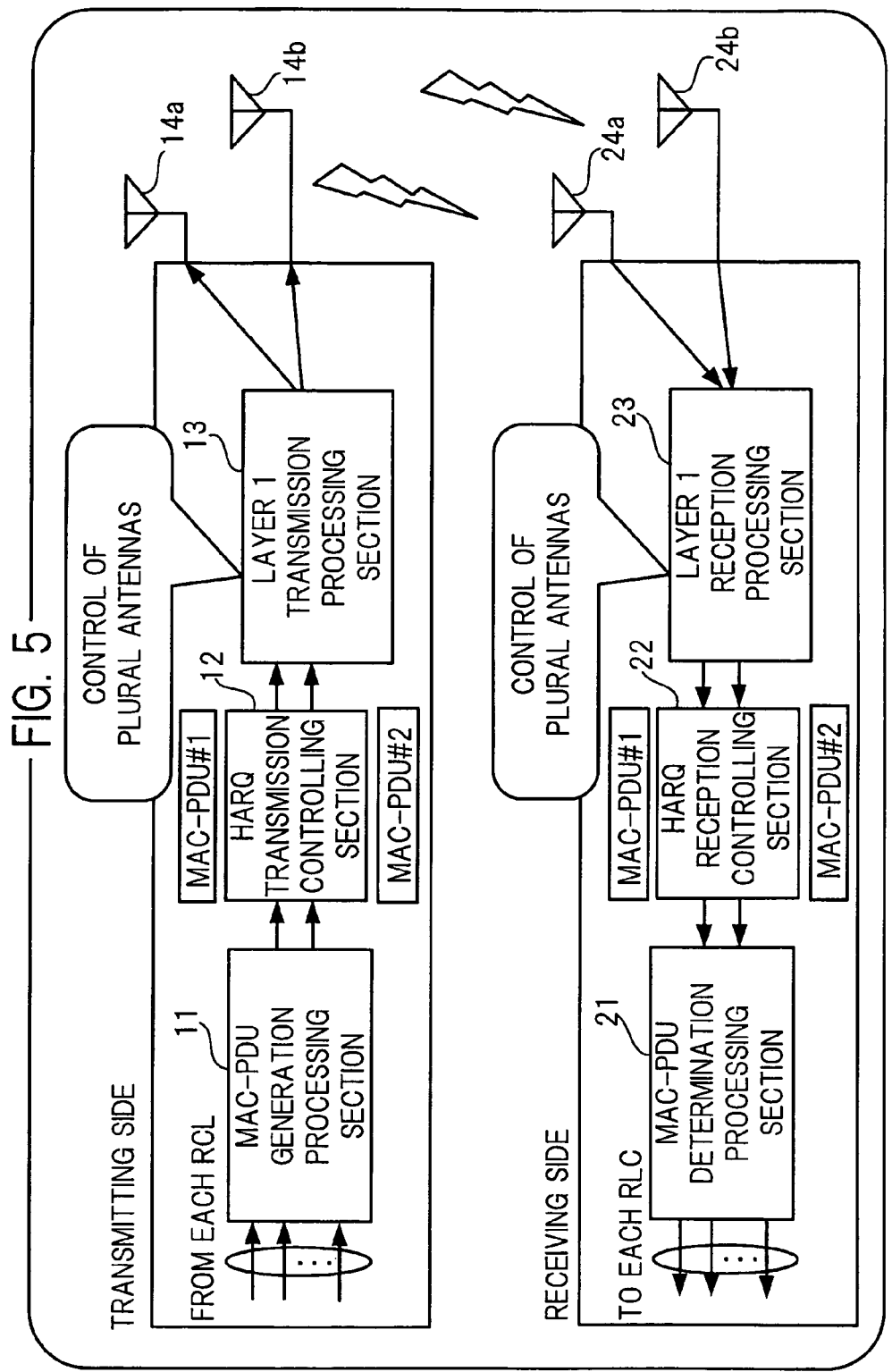
FIG. 5 is a block diagram illustrating an outline of a transmitting apparatus and a receiving apparatus employing MIMO.
Figure 6:
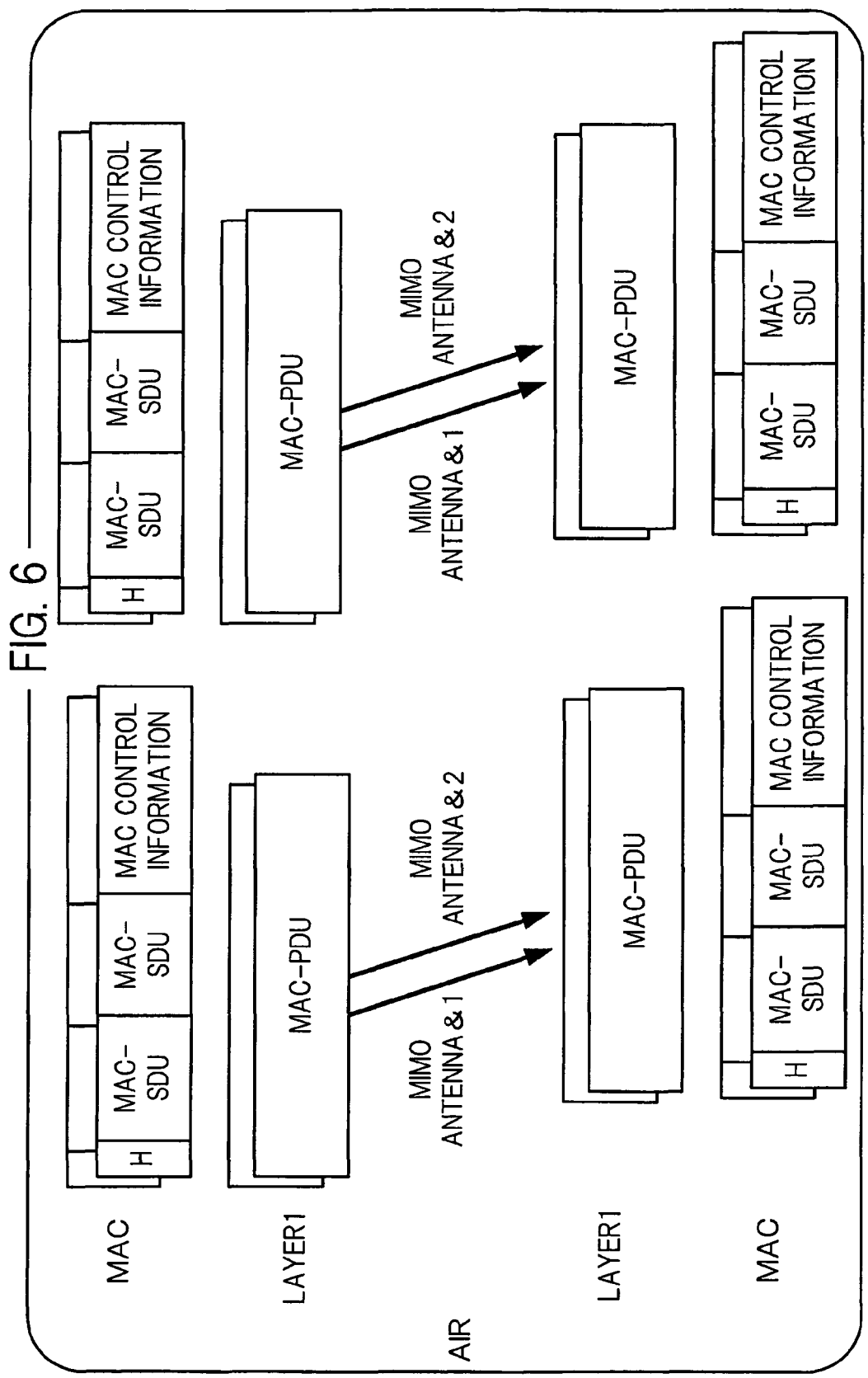
FIG. 6 illustrates a data flow when the MIMO is employed.

That is, the wireless communication apparatus of the present invention includes, as a block configuration, both the configurations of the transmitting side and the receiving side illustrated in the previously described FIG. 5 as one example, and only the point to be described in the following is different from the above-mentioned conventional technique.

Figure 8:
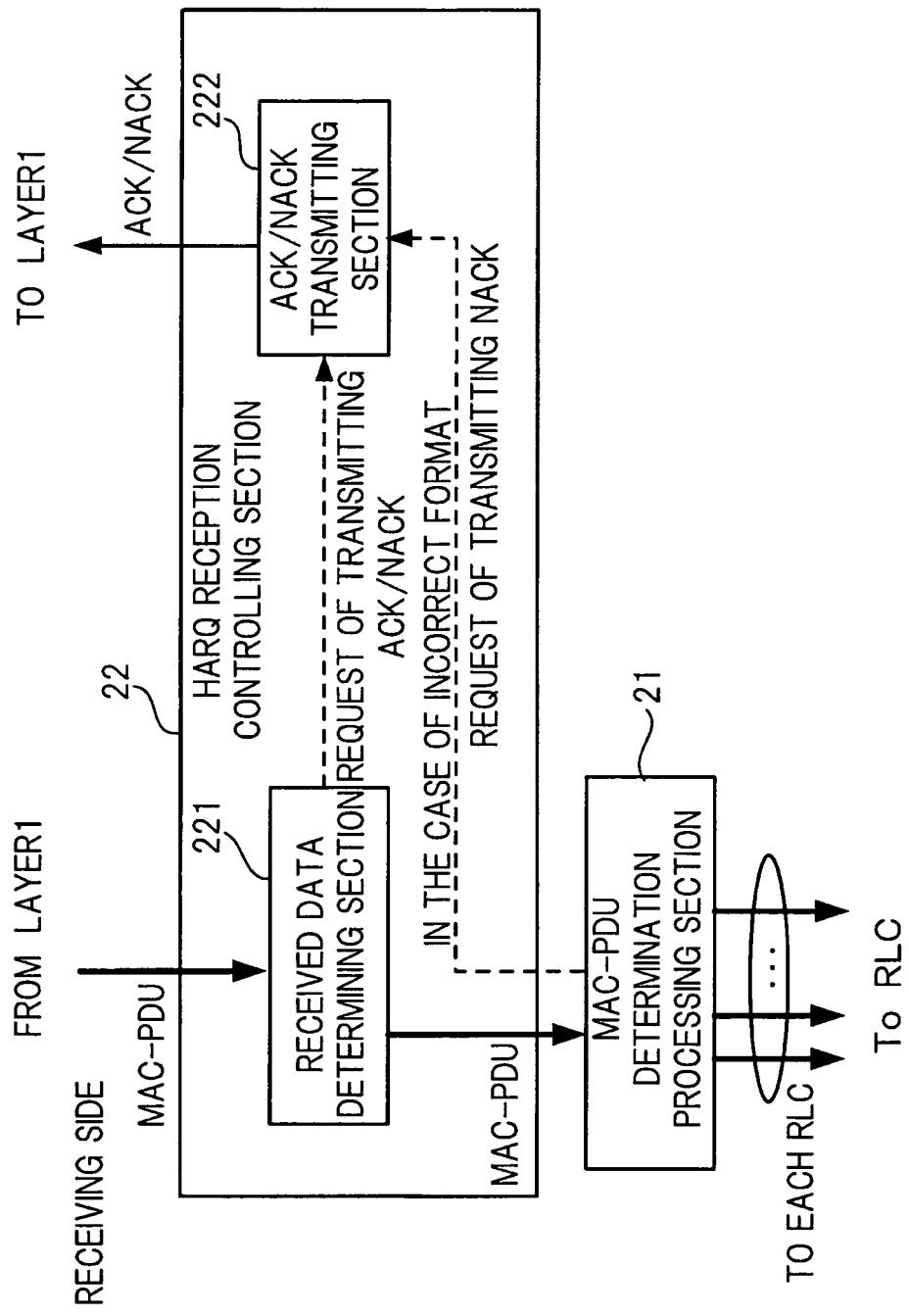
FIG. 8 is a block diagram illustrating a HARQ reception controlling section and a MAC-PDU determination processing section in a first embodiment of the present invention.

FIG. 8 is a block diagram illustrating the HARQ reception controlling section and the MAC-PDU determination processing section in a first embodiment of the present invention.

When a MAC-PDU transmitted from the transmitting side is received, a received data determining section 221 of the HARQ reception controlling section 22 on the receiving side performs a CRC check for the received MAC-PDU. If it is a normal receiving (CRC-OK), the MAC-PDU is transmitted to the MAC-PDU determination processing section 21 and also a request of transmitting an ACK is made for an ACK-NACK transmitting section 222, and the ACK is transmitted from the ACK-NACK transmitting section 222 via the layer 1. However, in spite of the request of transmitting the ACK made from the received data determining section 221 toward the ACK-NACK transmitting section 222, there is a case in which the ACK is not transmitted but a NACK is transmitted from the ACK-NACK transmitting section 222 as will be explained below.

When the received data determining section 221 determines that the reception is abnormal (CRC-NG), a request of transmitting a NACK is made from the received data determining section 221 toward the ACK-NACK transmitting section 222, and the NACK is transmitted from the ACK-NACK transmitting section 222 toward the transmitting side via the layer 1. As already explained, the transmitting side manages a transmission time of a MAC-PDU and it is possible to identify, if an ACK or a NACK is received, which PDU the ACK or the NACK corresponds to, from a reception time of the ACK or the NACK. Also in the MIMO, since an ACK and a NACK is transmitted from the same antenna as that having received the ACK and the NACK on the receiving side, it is possible to identify, on the transmitting side of the PDU, which MAC-PDU the ACK and the NACK corresponds to, from the transmission time and the antenna having received the ACK and the NACK.

Figure 1:
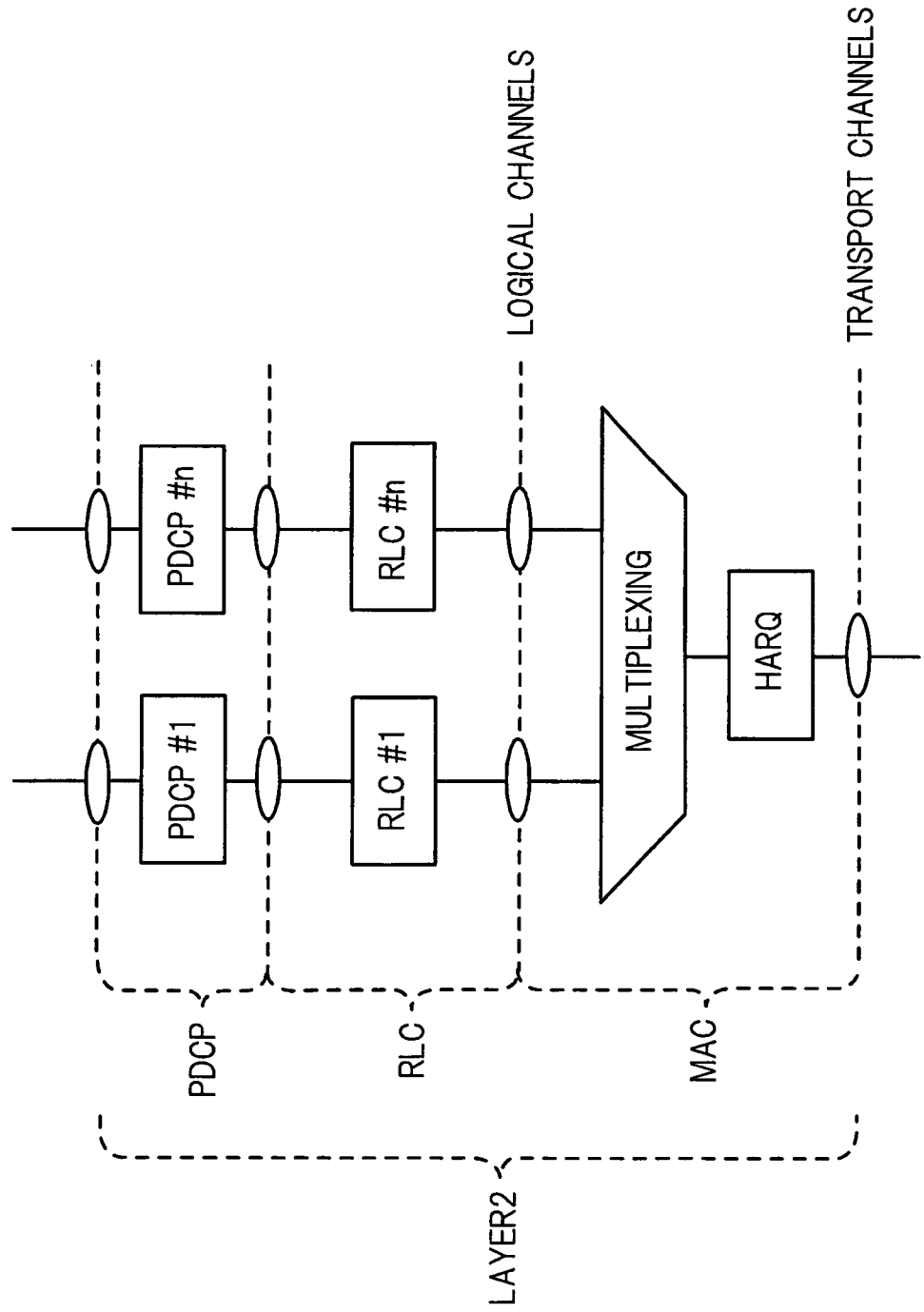
FIG. 1 is a protocol block diagram of a layer 2.
Figure 2:
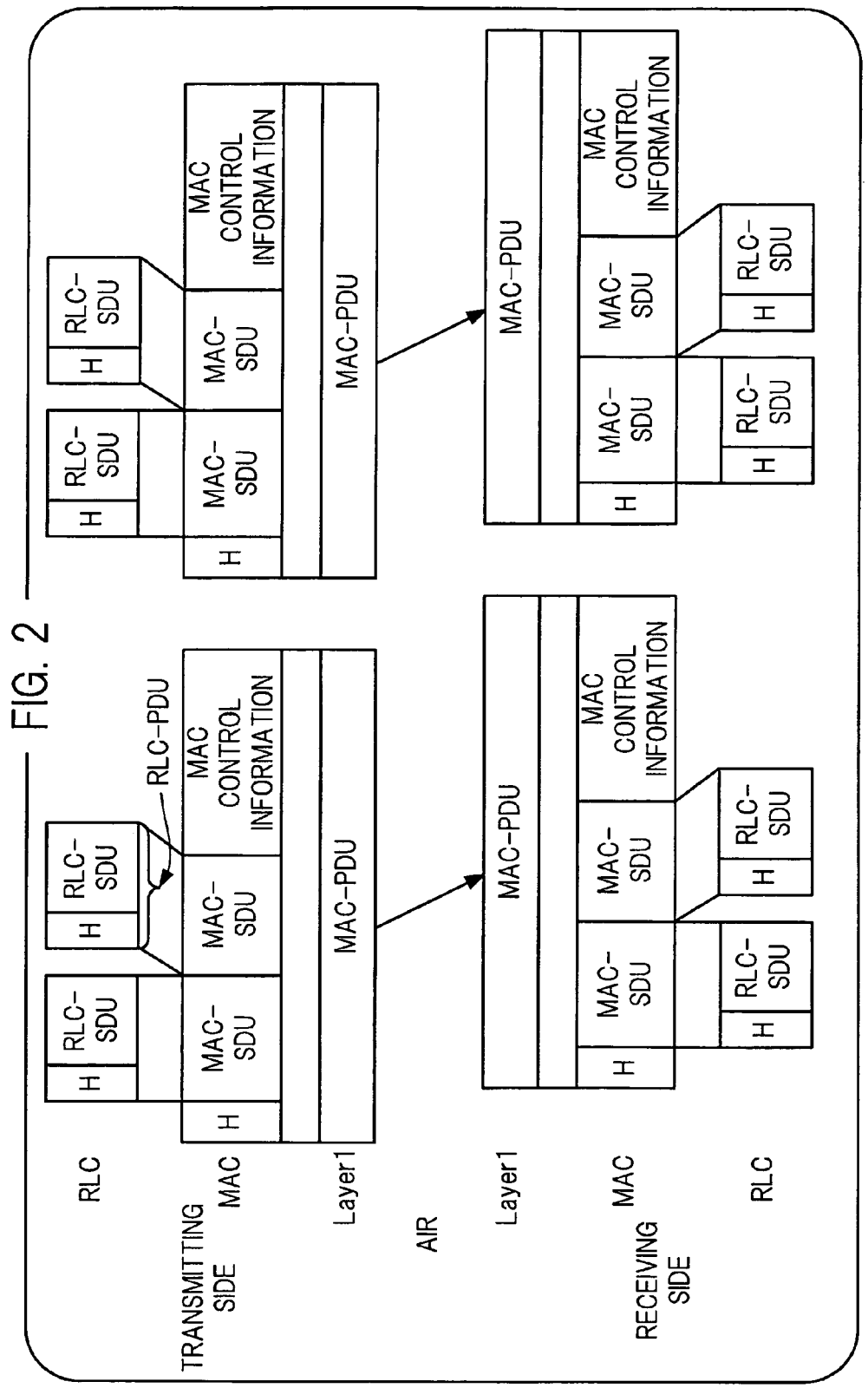
FIG. 2 illustrates an example of a data flow of a PDU with control information added thereto.

Here, the MAC-PDU that is determined as a normal reception (CRC-OK) in the received data determining section 221 and passed to the MAC-PDU determination processing section 21 is determined, this time, whether it is a PDU in a normal format or an incorrect format in the MAC-PDU determination processing section 21. If it is a PDU in the normal format, the MAC-PDU is divided into SDU's for each LCH to be passed to a RLC entity of each LCH (see FIG. 2).

On the other hand, when determined to be a PDU in the incorrect format in the MAC-PDU determination processing section 21, the PDU is discarded. What described hitherto is similar to the above-described conventional technique, however in the present embodiment, when the MAC-PDU determination processing section 21 determines that the PDU is in the incorrect format, discards the PDU and requests the ACK-NACK transmitting section 222 of the HARQ reception controlling section 22 to transmit a NACK, and causes the ACK-NACK transmitting section 222 to renew the request of transmitting the ACK which is transmitted from the received data determining section 221. Then, upon receipt of the request from the MAC-PDU determination processing section 21, the ACK-NACK transmitting section 222 transmits a NACK toward the transmitting side via the layer 1.

Figure 9:
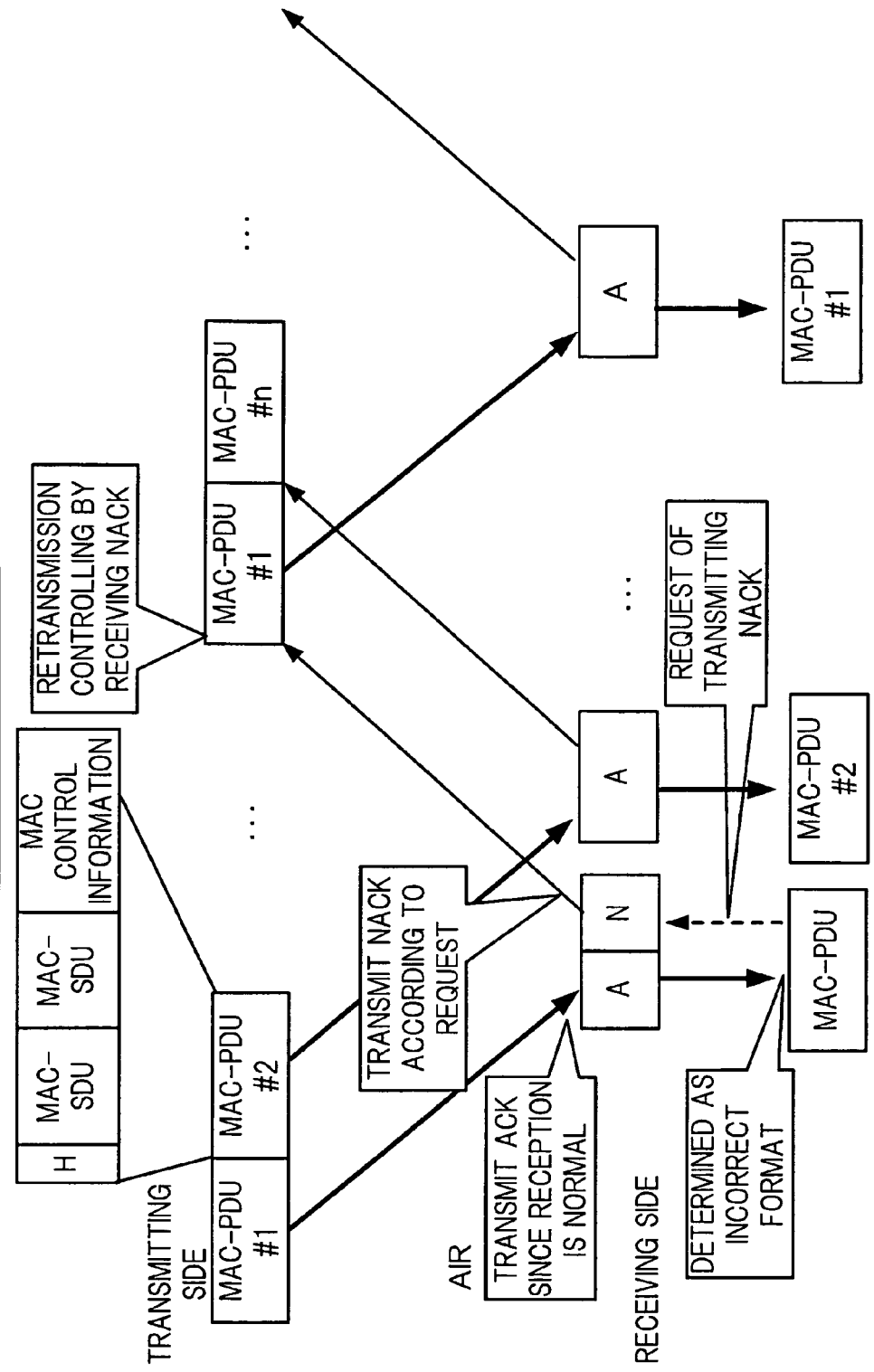
FIG. 9 illustrates a data flow in the embodiment illustrated in FIG. 8.

FIG. 9 illustrates a data flow in the embodiment illustrated in FIG. 8.

In the example illustrated here, a base station is the transmitting side, and two MAC-PDU's of the MAC-PDU #1 and the MAC-PDU #2 are representatively transmitted from the transmitting side and received by a cellular telephone that is the receiving side. On the receiving side, a determination is made in a MAC sub layer further in the layer 2 whether it is a normal reception (CRC-OK) or an abnormal reception (CRC-NG).

Here, firstly, the determination is made for the MAC-PDU #1, and since it is a normal reception (CRC-OK), an ACK is to be transmitted toward the transmitting side here. However, in the meantime while the ACK is not yet transmitted, whether a format of the MAC-PDU #1 is normal or incorrect is determined, and if the format of the MAC-PDU #1 is incorrect, the ACK which is to be transmitted because of the normal reception (CRC-OK) is renewed with a NACK to be transmitted toward the transmitting side. Then, on the transmitting side, since the NACK is received, the MAC-PDU #1 corresponding to the NACK is retransmitted toward the receiving side.

As for the MAC-PDU #2, since the reception is normal and the format is normal as well, an ACK is transmitted toward the transmitting side, and on the transmitting side, a MAC-PDU #n that has not yet been transmitted is transmitted without retransmitting the MAC-PDU #2.

With this, not only when the reception is abnormal (CRC-NG), but also when the PDU is in an incorrect format even if the reception is normal (CRC-OK), a retransmission request is made in a MAC sub layer. As such, the retransmission request is made without waiting for the retransmission request from a RLC sub layer, so that a time until the retransmission request is reduced and thereby a throughput as the entire system is improved.

Incidentally, here, although the explanation is made by assuming the base station is the transmitting side and the cellular telephone is the receiving side, same is also applied to a case where the cellular telephone is the transmitting side and the base station is the receiving side.

In the layer 1 on the transmitting side, the MAC-PDU which is transmitted once is stored for a while, and the stored MAC-PDU is retransmitted when a NACK corresponding to the once transmitted MAC-PDU is received. Thus, although the first embodiment is effective for an error that occurs between the layer 1 on the transmitting side and the MAC-PDU determination processing on the receiving side including the layer 1 on the transmitting side, it is impossible to cope with a case in which an error occurs in the MAC-PDU in the step of generating the MAC-PDU on the transmitting side or in the step of passing the generated MAC-PDU to the layer 1 on the transmitting side, even if retransmission is repeatedly tried. Because of this, in the MAC-PDU determination processing on the receiving side, when the format of the MAC-PDU that is retransmitted due to reception of the NACK is the same incorrect format as that of the MAC-PDU before the retransmission, retransmission request is not performed anymore. This prevents useless retransmission from being repeated and may allocate communication resources to another PDU.

Subsequently, a second embodiment of the present invention will be explained.

Figure 10:
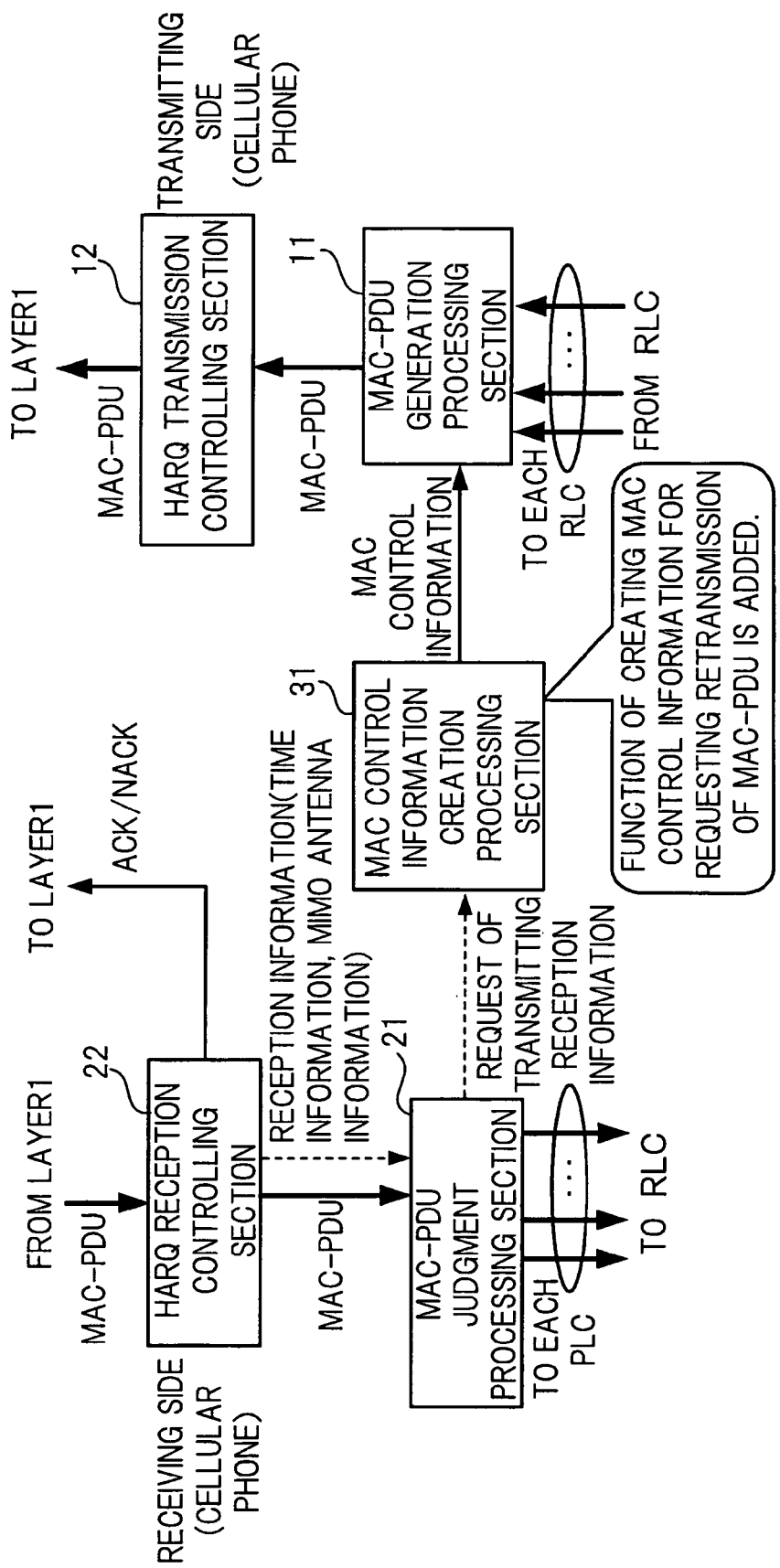
FIG. 10 is a block diagram illustrating a configuration in a MAC sub layer on the receiving side in a second embodiment of the present invention.

FIG. 10 is a block diagram illustrating a configuration in a MAC sub layer on the receiving side in the second embodiment of the present invention.

In the HARQ reception controlling section 22 on the receiving side (here, cellular telephone), a CRC check is performed for a received MAC-PDU similarly as described above, and according to a normal reception (CRC-OK) or an abnormal reception (CRC-NG), an ACK or a NACK is transmitted toward the transmitting side (base station). An ACK or a NACK at this time is transmitted depending on either the normal reception (CRC-OK) or the abnormal reception (CRC-NG), and whether the format is normal or incorrect is not taken into consideration.

When determined to be the normal reception (CRC-OK) in the HARQ reception controlling section 22, the MAC-PDU is transmitted to the MAC-PDU determination processing section 21. At this time, from the HARQ reception controlling section 22, reception information including time information indicating a time when the MAC-PDU is received and MIMO antenna information to identify an antenna having received the MAC-PDU when MIMO is used is also passed to the MAC-PDU determination processing section 21 together with the MAC-PDU. In the MAC-PDU determination processing section 21, a format of the received MAC-PDU is examined to determine whether it is a normal format or an incorrect format. When it is the normal format, the MAC-PDU is divided into MAC-SDU=RLC-PDU for each LCH to be passed to a RLC entity of each LCH.

On the other hand, when determined to be the incorrect format in the MAC-PDU determination processing section 21, the MAC-PDU determined to be the incorrect format is discarded, and a retransmission request accompanied with the reception information (time information and MIMO antenna information) is passed to a MAC control information creation processing section 31. Although the MAC control information creation processing section 31 is not explicitly illustrated in FIG. 5, it is a constituent element in a MAC sub layer to handle the creation of the MAC control information of the MAC-PDU that is transmitted from the cellular telephone toward the base station.

Here, various kinds of MAC control information are created according to demands on occasions. The present embodiment is characterized in that the MAC control information creation processing section 31 creates the MAC control information in which the retransmission request received from the MAC-PDU determination processing section 21 is embedded. The retransmission request that is embedded in the MAC control information includes the reception information (time information and MIMO antenna information). The MAC control information created in the MAC control information creation processing section 31 is passed to the MAC-PDU generation processing section 11 in the same cellular telephone. The MAC-PDU generation processing section 11 integrates the RLC-PDU's (MAC-SDU's) received from the RLC entities and further adds the MAC control information received from the MAC control information creation processing section 31 and a header to generate a MAC-PDU. The MAC-PDU generated in the MAC-PDU generation processing section 11 is passed to the HARQ transmission controlling section 12 and further transmitted toward a base station via the layer 1 of the cellular telephone. The base station side refers to the control information of the received MAC-PDU and recognizes the retransmission request included in the control information and further identifies a particular MAC-PDU to be retransmitted by the reception information (time information and MIMO antenna information) added to the retransmission request, and retransmits the MAC-PDU. At this time, on the base station side, the MAC-PDU which is stored until the ACK or the NACK is received no longer exists, and the base station side again receives the RLC-PDU's (MAC-SDU's) necessary for building the MAC-PDU to be retransmitted from the RLC of each LCH on the base station side, to regenerate and retransmit the MAC-PDU.

As such, in the second embodiment, an error occurred in the process of generating the MAC-PDU on the transmitting side or in the process of passing the generated MAC-PDU to the layer 1 on the transmitting side may be coped with. However, also in this embodiment, when the retransmitted MAC-PDU is of the incorrect format same as that of the MAC-PDU before the retransmission, it is desirable not to request retransmission anymore.

FIG. 11 illustrates a data flow in the embodiment illustrated in FIG. 10.

Figure 3:
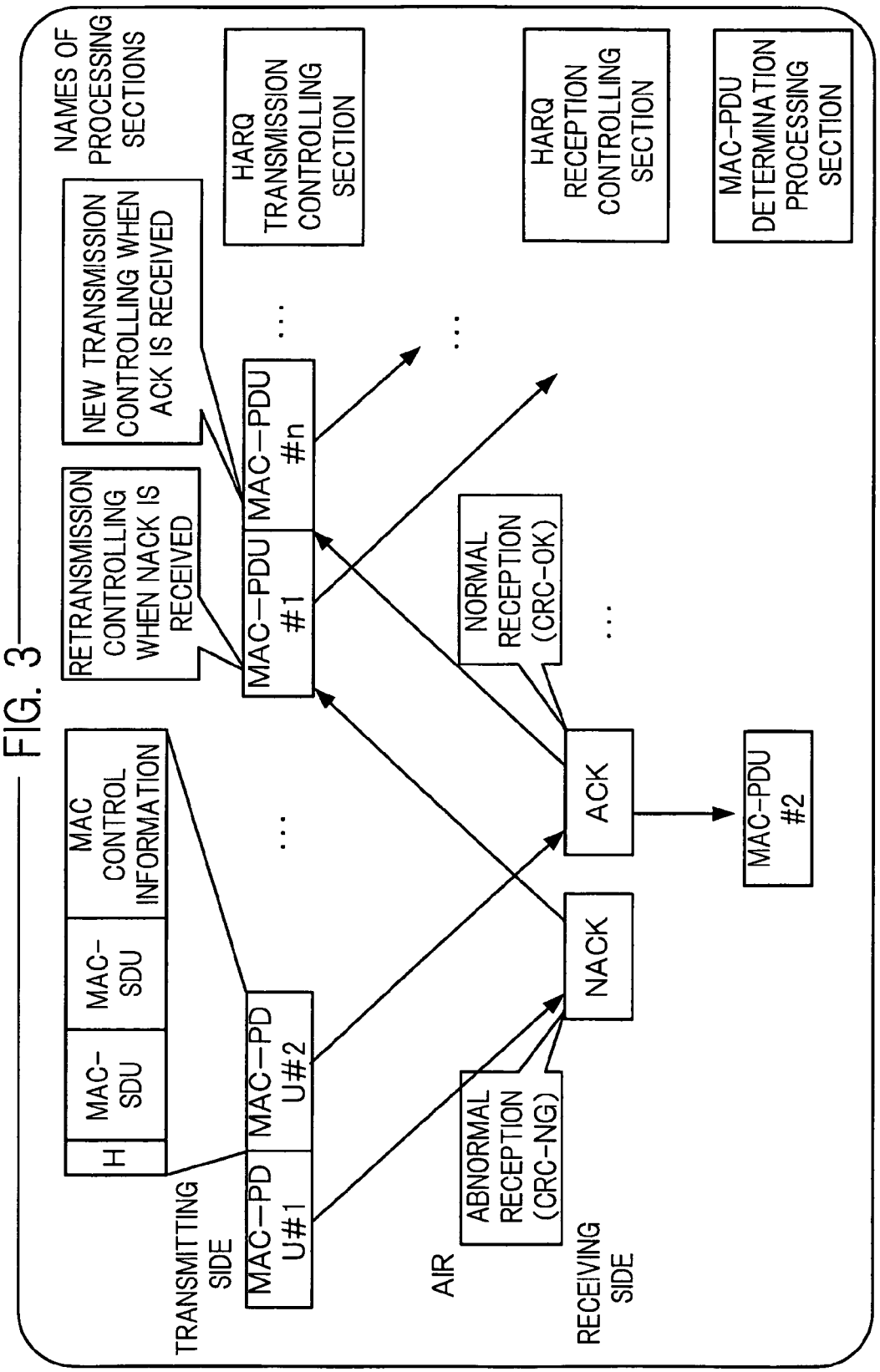
FIG. 3 illustrates a data flow including returning of ACK and NACK by a HARQ on a receiving side.
Figure 4:
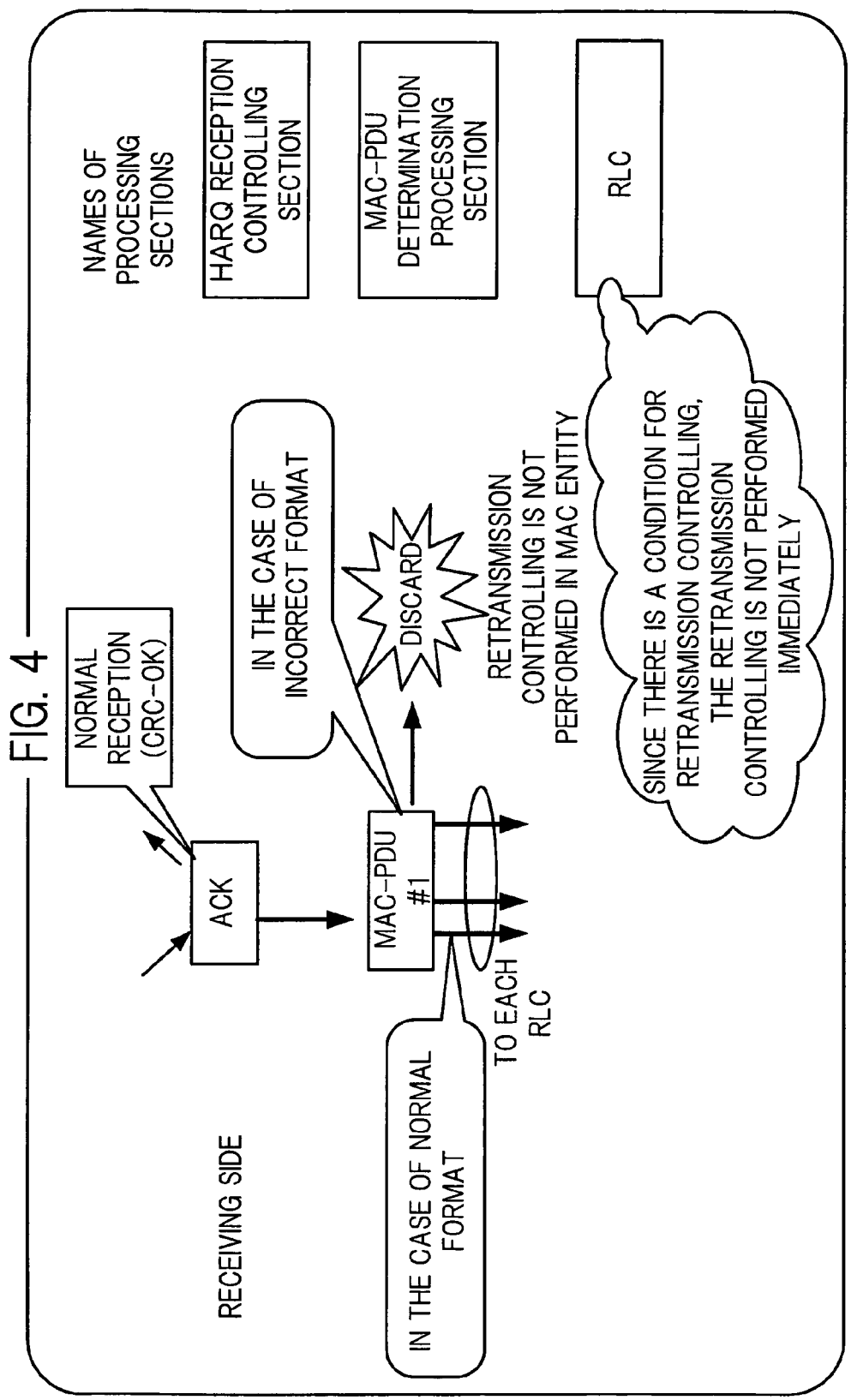
FIG. 4 is a schematic diagram illustrating a determination processing whether a PDU is in a normal format or an incorrect format in a MAC-PDU determination processing section.

Here, the drawing representatively illustrates that two MAC-PDU's of the MAC-PDU #D1 and the MAC-PDU #D2 are transmitted from the base station that is the transmitting side to the cellular telephone that is the receiving side. Although in the MAC sub layer on the receiving side, the CRC check and the transmission of an ACK and a NACK are performed, they are similar to the conventional technique (see FIG. 3) and illustration is omitted here.

In the MAC sub layer on the receiving side, when it is a normal reception (CRC-OK) after a CRC check, a format of the received MAC-PDU is subsequently examined to determine whether the format is normal or incorrect. When determined to be normal, the same procedure as the conventional technique or the above-mentioned first embodiment takes place.

On the other hand, when it is determined that the received MAC-PDU is a PDU of an incorrect format, the MAC-PDU is discarded, and this time, a retransmission request in which reception information including the time information indicating a time when the MAC-PDU of the incorrect format is received and the MIMO antenna information for identifying an antenna having received the MAC-PDU are added, is embedded in the MAC control information of a MAC-PDU that is built in a case where the same cellular telephone becomes the transmitting side, and the MAC-PDU (MAC-PDU #U1 in FIG. 11) is transmitted toward the base station.

The base station analyzes the MAC control information of the received MAC-PDU #U1, recognizes that the MAC-PDU #D1 needs to be retransmitted, regenerates and retransmits the MAC-PDU #D1 to the cellular telephone.

Also in the second embodiment, in the event of an incorrect format, a request of retransmission is made in the MAC sub layer so that the throughput of the entire system is improved.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A wireless communication apparatus, wherein the wireless communication apparatus uses a communication protocol to transmit and receive a MAC PDU with a data check bit, the wireless communication apparatus comprising:
   a receiving section that receives the MAC PDU from another wireless communication apparatus of a transmitting origin;
   a received MAC PDU determining section that performs a data check for the received MAC PDU by using the data check bit and determines whether a transmission of the MAC PDU produces an error;
   a received result transmitting section that, when the transmission of the MAC PDU produces an error, discards the MAC PDU and transmits a retransmission request for the MAC PDU to the other wireless communication apparatus, and when the transmission of the MAC PDU does not produce an error, transmits a message indicating that the MAC PDU is normal to the other wireless communication apparatus;
   a determining section that determines whether an identity of MAC control information is designated correctly, and that passes the MAC PDU to a predetermined processing and discards the MAC PDU when the identity of the MAC control information is designated incorrectly; and
   a transmitting section that transmits the MAC PDU toward another wireless communication apparatus of a transmitting destination, and
   wherein when the identity of the MAC control information is incorrect, the determination section discards the MAC PDU and instead of requesting the received result transmitting section to retransmit the MAC PDU, requests the transmitting section to embed a retransmission request in communication control information of the MAC PDU to be transmitted to the other wireless communication apparatus and transmits the MAC PDU.

2. The wireless communication apparatus according to claim 1, wherein the communication protocol of the wireless communication apparatus includes a MAC (Medium Access Control) protocol, the data check is a CRC (Cyclic Redundancy Check), and the predetermined processing is a RLC (Radio Link Control).

3. The wireless communication apparatus according to claim 1, wherein the determining section requests the transmitting section to embed a retransmission request including reception time information of the received MAC PDU in communication control information of the MAC PDU to be transmitted to the other wireless communication apparatus and transmits the MAC PDU.

4. The wireless communication apparatus according to claim 3, wherein the wireless communication apparatus comprises a plurality of antennas and performs MIMO (Multiple-Input Multiple-Output) communication by using the plurality of antennas, and the determining section requests the transmitting section to embed a retransmission request including antenna identification information as well as the reception time information of the received MAC PDU in communication control information of the MAC PDU to be transmitted to the other wireless communication apparatus and transmitting the MAC PDU.

5. The wireless communication apparatus according to claim 1, wherein the communication protocol of the wireless communication apparatus includes a MAC (Medium Access Control) protocol, the data check is a CRC (Cyclic Redundancy Check), the communication control information is MAC control information, and the predetermined processing is a RLC (Radio Link Control).

6. The wireless communication apparatus according to claim 1, wherein the determining section stops performing the retransmission request of the MAC PDU when after the identity of the MAC control information is again designated incorrectly.

7. A wireless communication control apparatus, wherein the wireless communication control apparatus is used in another wireless communication apparatus which uses a communication protocol to transmit and receive a MAC PDU with a data check bit, the other wireless communication apparatus including a receiving section and a received result transmitting section, to control communication, and the wireless communication control apparatus comprising:
 a received data determining section that performs a data check for the received MAC PDU by using the data check bit and determines whether a transmission of the MAC PDU produces an error;
 a received result transmission instructing section that, when the transmission of the MAC PDU produces an error, discards the MAC PDU and instructs the received result transmitting section to transmit a retransmission request of the MAC PDU to the other wireless communication apparatus of a transmitting origin, and MAC PDU is normal to the other wireless communication apparatus;
 a determining section that determines whether an identity of MAC control information is designated correctly and discards the MAC PDU and requests a retransmission of the MAC PDU, by the received result transmitting section, when the identity of the MAC control information is designated incorrectly; and
 a transmitting section, and
 wherein, when the identity of the MAC control information is incorrect, the determining section discards the MAC PDU and instead of requesting the received result transmitting section to retransmit the MAC PDU, requests the transmitting section to embed a retransmission request in communication control information of the MAC PDU to be transmitted to the other wireless communication apparatus.

8. The wireless communication control apparatus of claim 7, comprising:
 a format determining section that determines whether a format of the MAC PDU is incorrect or normal, and that passes a result determined by the format determining section to a predetermined processing when the format of the MAC PDU is determined to be normal; and
 a retransmission asking section that discards the MAC PDU and requests the received result transmitting section for transmitting when the format of the MAC PDU is determined to be incorrect.

9. A wireless communication method, wherein the wireless communication method uses a wireless communication apparatus which uses a communication protocol to transmit and receive a MAC PDU with a data check bit and which includes a receiving section, a received data determining section, a received result transmitting section, a transmitting section and a determining section, the wireless communication method comprising:
 receiving the MAC PDU from another wireless communication apparatus of a transmitting origin by using the receiving section;
 performing, using the received data determining section, a data check for the received MAC PDU by using the data check bit and determining whether a transmission of the MAC PDU produces an error;
 discarding, using the received result determining section, the MAC PDU and transmitting a retransmission request of the MAC PDU to the other wireless communication apparatus when the transmission of the MAC PDU produces an error, and transmitting a message indicating the MAC PDU is normal to the other wireless communication apparatus when the transmission of the MAC PDU does not produce an error;
 determining, by using the determining section, whether an identity of MAC control information is designated correctly, and passing the MAC PDU to a predetermined processing and discarding the MAC PDU and requesting the received result transmitting section to request a retransmission of the MAC PDU when the identity of the MAC control information is designated incorrectly; and
 transmitting data including communication control information in which a retransmission request is embedded, to the other wireless communication apparatus by using the transmitting section, and
 wherein in the discarding when the identity of MAC control information is designated incorrectly and, instead of requesting the received result transmitting section to retransmit the MAC PDU, a request is made to the transmitting section to embed a retransmission request in communication control information of the MAC PDU to be transmitted to the other wireless communication apparatus and transmitting the MAC PDU.

10. The wireless communication method of claim 9, comprising:
 determining whether a format of the MAC PDU is incorrect or normal, and that passes a result determined by the determining of the format to a predetermined processing when the format of the MAC PDU is determined to be normal; and
 discarding the MAC PDU and requesting the received result transmitting section to transmit when the format of the MAC PDU is determined to be incorrect.

11. A storage medium storing a wireless communication program that causes a wireless communication apparatus to perform reception processing of data, wherein the wireless communication apparatus uses a communication protocol to transmit and receive MAC PDU with a data check bit and includes a receiving section, a received data determining section, a received result transmitting section, a transmitting section and a determining section, the wireless communication program causing the wireless communication apparatus to perform a process comprising:
receiving the MAC PDU from another wireless communication apparatus of a transmitting origin;
performing, using the received data determining section, a data check for the received MAC PDU by using the data check bit and determining whether a transmission of the MAC PDU produces an error;
discarding, using the received result transmitting section, the MAC PDU and transmitting a retransmission request of the MAC PDU to the other wireless communication apparatus when the transmission of the MAC PDU produces an error, and transmitting a message indicating that the MAC PDU is normal to the other wireless communication apparatus when the transmission of the MAC PDU does not produce an error;
determining, using the determining section, whether an identity of MAC control information is designated correctly and passing the data to a predetermined processing and discarding the MAC PDU and requesting a retransmission of the MAC PDU when the identity of MAC control information is designated incorrectly; and
transmitting, by the transmitting section, the MAC PDU to the other wireless communication apparatus, and
wherein in the discarding when the identity of MAC control information is designated incorrectly, instead of requesting the received result transmitting section to retransmit the MAC PDU, a request is made to the transmitting section to embed a retransmission request in communication control information of the MAC PDU to be transmitted to the other wireless communication apparatus to transmit the MAC PDU.

12. The storage medium storing a wireless communication control program of claim 11, wherein the process comprising:
determining whether a format of the MAC PDU is incorrect or normal, and that passes a result determined by the determining of the format to a predetermined processing when the format of the MAC PDU is determined to be normal; and
discarding the MAC PDU and requesting the received result transmitting section to transmit when the format of the MAC PDU is determined to be incorrect.

13. A wireless communication control method, wherein the wireless communication control method which uses a wireless communication control apparatus used in another wireless communication apparatus that uses a communication protocol to transmit and receive a MAC PDU with a data check bit and that includes a receiving section, a transmitting section and a received result transmitting section, to control communication, and the wireless communication control method comprising:
performing a data check for the received MAC PDU by using the data check bit to determine whether a transmission of the MAC PDU produces an error;
discarding the MAC PDU and instructing the received result transmitting section to transmit a retransmission request of the MAC PDU to the other wireless communication apparatus of a transmitting origin when the transmission of the MAC PDU produces an error, and instructing the received result transmitting section to transmit a message indicating that the MAC PDU is normal to the other wireless communication apparatus when the transmission of the MAC PDU does not produce an error;
determining whether a an identity of MAC control information is designated correctly, and passing the MAC PDU to a predetermined processing and discarding the MAC PDU and requesting the received result transmitting section to retransmit the MAC PDU when the identity of MAC control information is designated incorrectly; and
transmitting the MAC PDU including communication control information in which a retransmission request is embedded, to the other wireless communication apparatus by using the transmitting section, and
wherein in the discarding, when the identity of MAC control information is designated incorrectly, instead of requesting the received result transmitting section retransmit the MAC PDU, a request is made to the transmitting section to embed a retransmission request in communication control information of the MAC PDU to be transmitted to the other wireless communication apparatus.

14. The wireless communication control method of claim 13, comprising:
determining whether a format of the MAC PDU is incorrect or normal, and that passes a result determined by the determining of the format to a predetermined processing when the format of the MAC PDU is determined to be normal; and
discarding the MAC PDU and requesting the received result transmitting section to transmit when the format of the MAC PDU is determined to be incorrect.

15. A storage medium storing a wireless communication control program that causes a wireless communication control apparatus to perform reception processing of data, wherein the wireless communication control apparatus is used in another wireless communication apparatus that uses a communication protocol to transmit and receive a MAC PDU with a data check bit and includes a receiving section, a transmitting section and a received result transmitting section, to control information, the wireless communication control program causing the wireless communication apparatus to perform a process comprising:
performing a data check for the received MAC PDU by using the data check bit and determining whether a transmission of the MAC PDU produces an error;
discarding the MAC PDU and instructing the received result transmitting section to transmit a retransmission request of the MAC PDU to the other wireless communication apparatus of a transmitting origin when the transmission of the MAC PDU produces an error, and instructing the received result transmitting section to transmit a message indicating that the MAC PDU is normal to the other wireless communication apparatus when the transmission of the MAC PDU does not produce an error;
determining whether an identity of MAC control information is designated correctly, and passing the MAC PDU to a predetermined processing and discarding the MAC PDU and requesting the received result transmitting section to retransmit the MAC PDU when the identity of MAC control information is designated incorrectly; and
transmitting the MAC PDU, using the transmitting section, to the other wireless communication apparatus, and
wherein in the discarding, when the identity of MAC control information is designated incorrectly, instead of requesting the received result transmitting section to retransmit the MAC PDU, a request is made to the transmitting section to embed a retransmission request in communication control information of the MAC PDU to be transmitted to the other wireless communication apparatus.

16. The storage medium storing a wireless communication control program of claim 15, wherein the process comprising:
- determining whether a format of the MAC PDU is incorrect or normal, and that passes a result determined by the determining of the format to a predetermined processing when the format of the MAC PDU is determined to be normal; and
- discarding the MAC PDU and requesting the received result transmitting section to transmit when the format of the MAC PDU is determined to be incorrect.

\* \* \* \* \*